US011500110B2

(12) United States Patent
Orendorff et al.

(10) Patent No.: US 11,500,110 B2
(45) Date of Patent: Nov. 15, 2022

(54) LOCALIZATION USING BEARING FROM ENVIRONMENTAL FEATURES

(71) Applicant: Google LLC, Mountain View, CA (US)

(72) Inventors: David William Earle Orendorff, Costa Mesa, CA (US); Imad Jean Fattouch, Mountain View, CA (US); Mohammed Khider, Mountain View, CA (US); Frank van Diggelen, Carmel-by-the-Sea, CA (US); Kevin Watts, Mountain View, CA (US)

(73) Assignee: Google LLC, Mountain View, CA (US)

( * ) Notice: Subject to any disclaimer, the term of this patent is extended or adjusted under 35 U.S.C. 154(b) by 77 days.

(21) Appl. No.: 17/005,135

(22) Filed: Aug. 27, 2020

(65) Prior Publication Data
US 2022/0066047 A1    Mar. 3, 2022

(51) Int. Cl.
  *G01S 19/22*    (2010.01)
  *G01C 21/30*    (2006.01)
  *G01S 19/40*    (2010.01)
(52) U.S. Cl.
  CPC .............. *G01S 19/22* (2013.01); *G01C 21/30* (2013.01); *G01S 19/40* (2013.01)
(58) Field of Classification Search
  CPC .......... G01S 19/22; G01S 19/40; G01S 19/50; G01C 21/30
  (Continued)

(56) References Cited

U.S. PATENT DOCUMENTS

| 4,807,127 A | * | 2/1989 | Tenmoku | ............... G01C 21/30 340/988 |
| 4,999,783 A | * | 3/1991 | Tenmoku | ............... G01C 21/30 701/300 |

(Continued)

FOREIGN PATENT DOCUMENTS

| CN | 105005039 B | * | 11/2017 | ............. G01C 21/26 |
| JP | 58113711 A | * | 7/1983 | ............. G01C 21/26 |
| WO | WO-2020039432 A1 | * | 2/2020 | ............. G01C 21/30 |

OTHER PUBLICATIONS

Aerial and satellite photography. (2018). The Columbia Encyclopedia (8th ed.). Columbia University Press. Credo Reference: https://search.credoreference.com/content/entry/columency/aerial_and_satellite_photography/0 (Year: 2018).*

*Primary Examiner* — Bernarr E Gregory
*Assistant Examiner* — Fred H Mull
(74) *Attorney, Agent, or Firm* — Honigman LLP; Brett A. Krueger

(57) ABSTRACT

A method of localization using bearing from environmental features includes receiving an estimated location of a global navigation satellite system (GNSS) receiver associated with a user and a corresponding bearing for the GNSS receiver. The method also includes identifying one or more environmental features about the estimated location of the GNSS receiver. The method further includes determining whether an orientation of a respective environmental feature of the one or more environmental features correlates to the corresponding bearing for the GNSS receiver. When the orientation of the respective environmental feature correlates to the corresponding bearing for the GNSS receiver, the method includes generating an updated bearing for the GNSS receiver or locational system that matches the orientation of the respective environmental feature.

18 Claims, 10 Drawing Sheets

(58) Field of Classification Search
USPC .................................................. 342/357.78
See application file for complete search history.

(56) References Cited

U.S. PATENT DOCUMENTS

| | | | |
|---|---|---|---|
| 2004/0044477 A1* | 3/2004 | Jung | G01C 21/30 |
| | | | 702/5 |
| 2017/0003685 A1* | 1/2017 | Pollock | G01C 21/30 |
| 2021/0003396 A1* | 1/2021 | Destelle | G01C 21/188 |
| 2021/0124057 A1* | 4/2021 | Luo | G01S 19/22 |

\* cited by examiner

LOCALIZATION USING BEARING FROM ENVIRONMENTAL FEATURES

TECHNICAL FIELD

This disclosure relates to localization using bearing from environmental features.

BACKGROUND

Global Navigation Satellite Systems (GNSS) use radio signals transmitted by orbiting satellites to determine precise ground locations, enabling advanced navigation and location-based services. Typically, a GNSS receiver receives one or more radio signals transmitted by the orbiting satellites and the GNSS receiver, or a locational system associated with the GNSS receiver, is able to determine the position of the GNSS receiver based on the timing of messages received from satellite(s) (e.g., often at least four satellites). Each message specifies the time of transmission and the position of the satellite at the time of transmission. The receiver or the locational system can compute the time of transit for each received message and often, using navigation equations, the location of the receiver. The location of the receiver may then be utilized by various applications ranging from telecommunication to navigation. As the number of applications that incorporate some aspect of GNSS-based localization continues to grow, these applications rely on the GNSS-based localization to be not only accurate in an open-sky environment, but also an urban environment. This is especially true when urban environments are densely populated with users of location-based services that deploy GNSS-based localization.

SUMMARY

One aspect of the disclosure provides a method of localization using bearing from environmental features. The method includes receiving, at data processing hardware, an estimated location of a global navigation satellite system (GNSS) receiver associated with a user and a corresponding bearing for the GNSS receiver. The method also includes identifying, by the data processing hardware, one or more environmental features about the estimated location of the GNSS receiver. The method further includes determining, by the data processing hardware, whether an orientation of a respective environmental feature of the one or more environmental features correlates to the corresponding bearing for the GNSS receiver. When the orientation of the respective environmental feature correlates to the corresponding bearing for the GNSS receiver, the method includes generating, by the data processing hardware, an updated bearing for the GNSS receiver that matches the orientation of the respective environmental feature.

In some examples, the method further includes generating, by the data processing hardware, a search area centered about the estimated location of the GNSS receiver where the search area indicates locational uncertainty for the estimated location of the GNSS receiver. In these examples, determining whether the orientation of the respective environmental feature of the one or more environmental features correlates to the corresponding bearing for the GNSS receiver includes determining whether the respective environmental feature is at least partially located in the search area centered about the estimated location of the GNSS receiver and, when the respective environmental feature is at least partially located in the search area centered about the estimated location of the GNSS receiver, determining whether the orientation of the respective environmental feature satisfies a bearing adjustment threshold with respect to the corresponding bearing for the GNSS receiver. Here, the bearing adjustment threshold indicates a maximum acceptable change in angle between the corresponding bearing and the updated bearing. In some configurations, the method also includes communicating, by the data processing hardware, the updated bearing to an entity responsible for hardware of the GNSS receiver.

Another aspect of the disclosure provides a system for localization using bearing from environmental features. The system includes data processing hardware and memory hardware in communication with the data processing hardware. The memory hardware stores instructions that when executed on the data processing hardware cause the data processing hardware to perform operations. The operations include receiving an estimated location of a global navigation satellite system (GNSS) receiver associated with a user and a corresponding bearing for the GNSS receiver. The operations also include identifying one or more environmental features about the estimated location of the GNSS receiver. The operations further include determining whether an orientation of a respective environmental feature of the one or more environmental features correlates to the corresponding bearing for the GNSS receiver. When the orientation of the respective environmental feature correlates to the corresponding bearing for the GNSS receiver, the operations include generating an updated bearing for the GNSS receiver that matches the orientation of the respective environmental feature.

In some examples, the operations further include generating a search area centered about the estimated location of the GNSS receiver where the search area indicates locational uncertainty for the estimated location of the GNSS receiver. In these examples, determining whether the orientation of the respective environmental feature of the one or more environmental features correlates to the corresponding bearing for the GNSS receiver includes determining whether the respective environmental feature is at least partially located in the search area centered about the estimated location of the GNSS receiver and, when the respective environmental feature is at least partially located in the search area centered about the estimated location of the GNSS receiver, determining whether the orientation of the respective environmental feature satisfies a bearing adjustment threshold with respect to the corresponding bearing for the GNSS receiver. Here, the bearing adjustment threshold indicates a maximum acceptable change in angle between the corresponding bearing and the updated bearing. In some configurations, the operations also include communicating the updated bearing to an entity responsible for hardware of the GNSS receiver.

Implementations of either the system or the method aspect of the disclosure may include one or more of the following optional features. In some implementations, receiving the estimated location of the GNSS receiver further includes determining the estimated location of the GNSS receiver based on a grid-based search using satellite signal strength data. In these implementations, the grid-based search may model satellite signal attenuation from an environment about the GNSS receiver. In some examples, determining whether the orientation of the respective environmental feature of the one or more environmental features correlates to the corresponding bearing for the GNSS receiver includes determining whether a respective location of the respective environmental feature satisfies a bearing adjustment threshold with respect to the estimated location of the GNSS receiver where the bearing adjustment threshold indicating a minimum proximity between the respective environmental feature and the estimated location of the GNSS receiver. In some implementations, determining whether the orientation of the respective environmental feature of the one or more environmental features correlates to the corresponding bearing for the GNSS receiver includes determining whether the orientation of the respective environmental feature satisfies a bearing adjustment threshold with respect to the corresponding bearing for the GNSS receiver where the bearing adjustment threshold indicates a maximum acceptable change in angle between the corresponding bearing and the updated bearing. In these optional features, the one or more environmental features may correspond to environmental features of an aerial imagery map of an environment about the estimated location of the user. The GNSS receiver may be located in an urban environment and the GNSS receiver receives reflecting satellite signals based on the urban environment.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
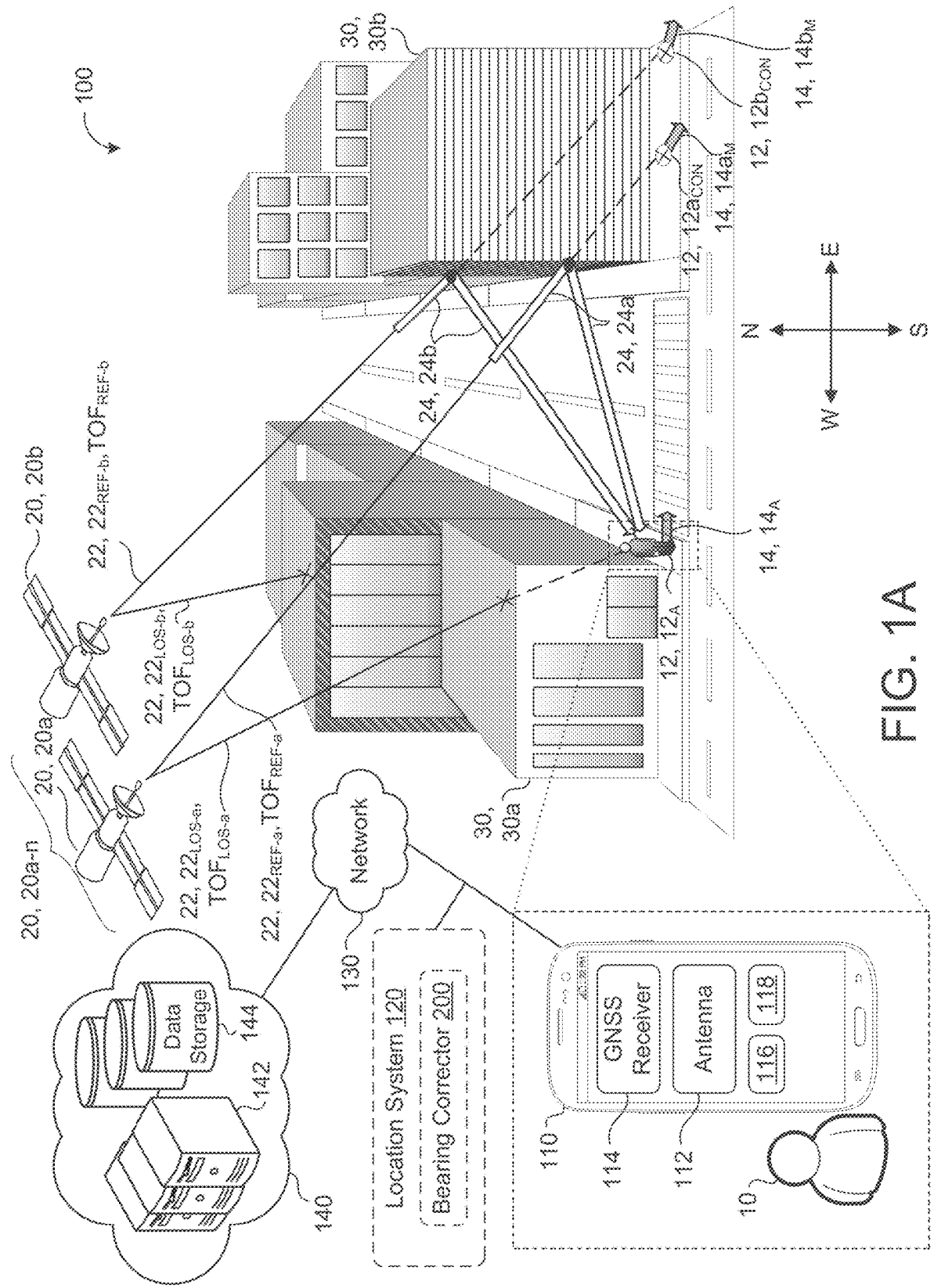
FIGS. 1A and 1B are perspective views of example urban environments where a GNSS receiver is located.

As GNSS-based localization has become a ubiquitous part of location-based services, GNSS receivers have been incorporated into numerous computing devices. With the incorporation of a GNSS receiver, a computing device is considered a GNSS-enabled device that may perform some role to support GNSS localization whether that be receipt of a signal transmitted by a satellite (i.e., a GNSS signal) or the entire computation of a location for the GNSS receiver. Here, GNSS localization refers to the function of determining the location of a GNSS component such as the GNSS receiver. Therefore, when a computing device includes a GNSS receiver, GNSS localization determines the location of the GNSS receiver and also, by association, may determine the location of the GNSS-enabled device. This allows GNSS localization to be implemented in order to locate almost any object outfit as a GNSS-enabled device. As a result, GNSS localization has been deployed to locate agriculture equipment, transportation vehicles (e.g., cars, trucks, trains, planes, etc.), mobile devices (e.g., mobile phones, laptops, tablets, etc.), wearables (e.g., smart watches), internet of things (IOT) devices, and/or other GNSS-enabled devices.

A GNSS receiver is configured to receive GNSS signals from one or more visible orbiting satellites. Here, a visible satellite or available satellite refers to a particular orbiting satellite that transmits a GNSS signal of sufficient magnitude for the GNSS localization process (e.g., by the GNSS receiver or a localization system associated with the GNSS receiver) to utilize in position and navigational determinations. In contrast, there may be other orbiting satellites that are non-visible orbiting satellites. A non-visible orbiting satellite or non-available satellite refers to a satellite for which a received GNSS signal is of insufficient magnitude to be utilized in position and navigational determinations in a GNSS localization process. Stated differently, an available satellite is considered "in communication with the GNSS receiver" because the GNSS receiver receives a GNSS signal of sufficient magnitude from an available or visible satellite. Although GNSS localization would prefer that satellites are visible (available) rather than not visible (not available), whether a satellite is visible to a GNSS-enabled device or not may be contingent on the environment or terrain about a GNSS-enabled device. In other words, when a GNSS-enabled device is in an open field, the open-field environment includes little if any terrain features that may inhibit a GNSS receiver from receiving a signal transmitted by an orbiting satellite. For instance, numerous satellites are visible in an open field. On the other hand, when a GNSS-enabled device is in a canyon surrounded by tall rock formations, there is likely to be only a small number of visible satellites, if any, and a greater number of non-visible satellites.

When a GNSS receiver is in a city or an urban environment, the GNSS receiver's ability to receive satellite signals is often more akin to a canyon than an open field. In a city or urban environment, the signals from one or more satellites may be blocked or attenuated by the structures or buildings of the city. To compound the issue that a GNSS receiver may have fewer visible satellites in an urban environment, the signals from satellites that are visible to the GNSS receiver are more likely being redirected (e.g., reflected, refracted, diffracted, or scattered one or more times) in the urban environment (e.g., off of structures or by structures) during their path to the GNSS receiver. These redirected (e.g., reflected) signals pose issues to systems that perform GNSS localization (referred to as locational systems) because GNSS localization uses time of flight for the path of the signal and assumes that received signals, whether redirected (e.g., reflected) or not, are line of sight signals. In other words, a line of sight signal has a path that extends from the satellite to the receiver without any redirection. Since, in reality, the signal is a redirected signal and seldom a line of sight signal, the redirection of the signal actually causes the signal to travel a greater distance than a distance traveled by a line of sight signal. Here, the difference between a line of sight signal and the greater distance of the actual or reflected signal is referred to as excess path length. The term excess path length identifies that the path of the reflected signal to the receiver has a longer (i.e., "excess") path length due to its reflection(s) than the path would have had as a direct line of sight signal.

Unfortunately, the location system, which is configured to identify where the receiver is located, inherently makes the assumption that signals received at the receiver are line of sight signals, even if they are, in reality, redirected signals. With this assumption, the location system often inaccurately identifies the location of the receiver in an urban space. An example manifesting this inaccuracy is that rideshare platforms using the GNSS system of GPS have a tendency to believe that a rideshare customer is on the other side of the street in an urban setting. Here, the rideshare customer's GPS receiver interprets its location on the wrong side of the street due to the excess path length of the reflected signal and relays this incorrect location to the rideshare driver via the rideshare platform. Since it is fairly common for locational systems in an urban environment to determine the location of the GNSS receiver on the wrong side of the street due to the excess path length, the GNSS industry sometimes refers to this problem as "the-wrong-side-of-the-street" problem.

But the line of sight assumption does not only lead to inaccuracies for the location of the receiver. The assumption that a signal is a line of sight signal also affects other computations made by the receiver. For instance, the receiver is generally configured to make determinations with respect to its own position and velocity based on the GNSS signal. During signal acquisition, a receiver detects signals from visible satellites and measures the Doppler frequency of the incoming signal for each satellite. Based on the Doppler frequency, the receiver derives its perceived velocity and direction (i.e., bearing). In other words, the Doppler frequency is a function of the relative velocity of the receiver with respect to the satellite and an angle between the bearing (or direction) of the receiver along the ground plane and the angle at which the receiver received the signal. Therefore, the receiver is able to derive its perceived velocity and bearing (i.e., direction) from the Doppler frequency when the receiver assumes that the signal is a line of sight signal from the satellite to the receiver (i.e., the angle is equal to the altitude of the satellite). Since this line of sight assumption is not always valid, especially when the receiver is located in urban environment where the signal is often a reflected signal, the perceived velocity and bearing for the receiver can often be inaccurate.

Inevitably inaccuracies for the velocity of the receiver and/or the bearing of the receiver are passed on to services and functionality that utilize these variables. For example, many navigation applications such as mapping applications try to display the position and the direction of the receiver (e.g., the user carrying the receiver) in real-time or near real-time. To provide this type of visual feedback, these applications rely on the position, velocity, and/or the bearing (i.e., direction) from the receiver. This is why, in an urban environment, the representation of the user's path in the mapping application may appear different than the path that the user is actually traveling. Mapping applications obtain instantaneous positions and bearings of the receiver at particular time steps and smooths these together for visualization. Yet because the receiver may be receiving a reflected signal or a change between a line of sight signal and a reflected signal as the user moves, the path of the receiver may appear sporadic (e.g., zigzagging) or drifting when compared to the actual path of travel for the receiver.

To address some of these issues, an approach has been developed that leverages features in the environment around the receiver. By leveraging features, this approach reorients the bearing of the receiver to align with an orientation of one or more features in the environment. In other words, when the receiver is in a mobile phone of the user, the user often either moves along a road (e.g., driving), adjacent to a road (e.g., a sidewalk), or along a building (e.g., also a sidewalk). This bearing-correction approach takes advantage of these conventions to adjust the bearing of the receiver from a likely inaccurate bearing to a bearing that is more likely to be accurate given the environment.

Figure 1B:
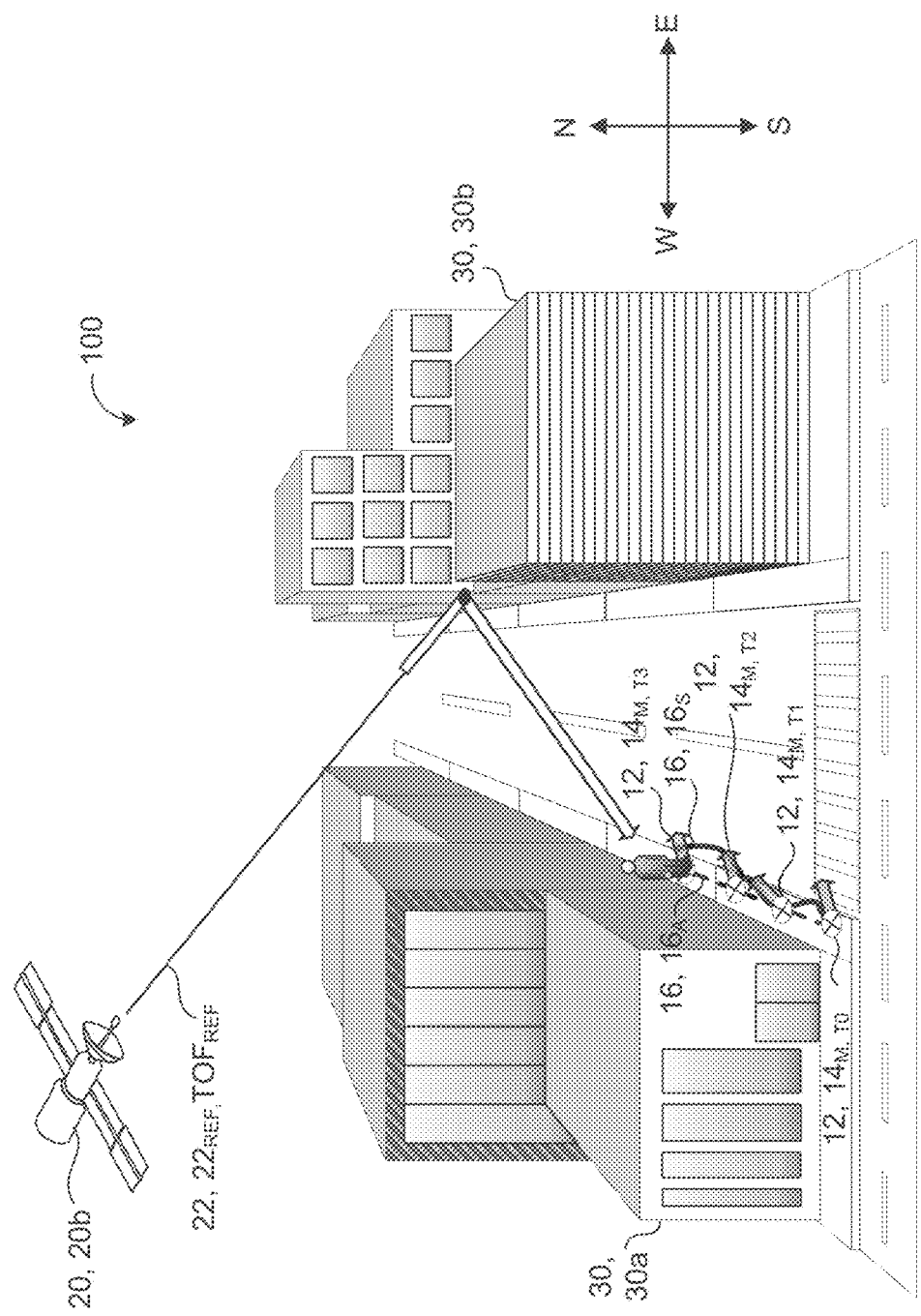

FIGS. 1A and 1B are examples of an urban environment 100 where a GNSS-enabled device 110 (also referred to as a device 110) associated with a user 10 receives GNSS signals 22 transmitted from one or more satellites 20, 20a-n. For instance, FIG. 1A depicts two visible satellites 20, 20a-b. Here, each satellite 20 is shown transmitting a line of sight signal 22, $22_{LOS}$ blocked by buildings 30 in the urban environment 100 and a reflected signal 22, $22_{REF}$ reflecting off a building 30, 30b in the environment 100 before it reaches the device 110 at the user 10. Although only one or two satellites 20 are depicted among the figures for simplicity, the GNSS-enabled device 110 may be configured to receive signals 22 at an antenna 112 associated with a GNSS receiver 114 transmitted from any GNSS satellite 20 within any of the GNSS constellations of satellites 20. In other words, the GNSS receiver 114 of the device 110 may receive signals 22 transmitted from satellites 20 associated with the Global Positioning System (GPS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS), and/or any similar systems, such as Low Earth Orbit or Geostationary satellites configured to transmit wireless signals. Moreover, although FIGS. 1A-1C depict an urban environment 100, this is merely for illustration. The systems and methods herein may function in any environment such as a non-urban and/or semi-urban environment.

The device 110 includes an antenna 112 and a GNSS receiver 114 (also referred to as receiver 114). The antenna 112 is configured to function as an interface to receive a transmitted signal 22 (e.g., radio waves) from satellite 20 and to communicate the received signal 22 as an electrical input to the receiver 114. Generally speaking, based on the electrical input from the antenna 112, the receiver 114 is configured to interpret the signal-based information embodied in the received signal 22. The signal-based information may also be referred to as GNSS measurements or raw GNSS measurements. Satellites 20 typically broadcast a signal 22 as a radio wave at an operating frequency and wavelength in the L-band (i.e., a band of the radio spectrum internationally designated for GNSS technologies) at a time according to their atomic clocks. The broadcasted signal 22 from a satellite 20 has a frequency in the L-band, satellite information (e.g., coded satellite information), and carries a navigation message. The navigation message includes timing information, such as a time at the satellite that the satellite transmitted the signal 22 and a time of arrival of the signal 22 at the receiver 114/antenna 112, and positional information, such as a location of the satellite 20 at the time of transmission. By having the time-of-flight TOF (e.g., shown as the time-of-flight $TOF_{LOS}$ for a line of sight signal $22_{LOS}$ and the time-of-flight $TOF_{REF}$ for a reflected signal $22_{REF}$) by the combination of the time of transmission and the time of arrival, the receiver 114 can measure a pseudorange corresponding to the range between the receiver 114 and the satellite 20 that sent the signal 22. To determine the satellite-to-receiver distance, the receiver 114 scales the pseudorange by the speed of light. This timing information also provides the receiver 114 with an understanding of a clock timing at the satellite (e.g., from the time of transmission) with respect to a clock timing at the receiver 114 (e.g., from the time of arrival). When the receiver 114 receives a signal 22, the receiver 114 is also configured to measure the strength of the signal 22 (e.g., in decibels (dBm or dBHz)). In addition to the timing information and positional information, the signal 22 includes satellite information. This satellite information may identify a unique identifier indicating the particular satellite 20 transmitting the signal 22 and the constellation for that particular satellite 20 (e.g., GPS, GLONASS, GALILEO, QZSS, BeiDou or IRNSS).

With respect to a GNSS signal 22, the message typically indicates timing information (e.g., when the signal 22 was transmitted by the satellite 20) and positional information (e.g., information regarding the position of the satellite 20 when the transmission was sent). From this signal-based information, a locational system 120 in communication with the receiver 114 determines a location 12 of the recipient of the signal 22, a speed of the recipient, and a bearing 14 for the speed of the recipient. Here, the bearing 14 refers to the direction of travel for the recipient. In the examples shown, the location 12 and bearing 14 of the recipient of the signal 22 is the location 12 and bearing 14 of the receiver 114, the device 110, and the user 10 since the receiver 114 is a component of the device 110 and the device 110 (e.g., shown as a mobile phone) is being carried by the user 10. Due to the synonymous locations/bearings of the device 110, the receiver 114, and the user 10 in these examples, the locations of these terms may be referred to interchangeably although it is conceivable that these locations may differ in other examples. For instance, the device 110 is a driver-less, self-driving vehicle with a GNSS receiver 114.

The device 110 may be any computing device capable of supporting the receiver 114. For instance, the device 110 is configured to support logic, circuitry, and/or code that is configured to determine its own location in response to a signal 22 from a satellite 20. Some examples of devices 110 include mobile devices (e.g., a mobile phone, laptop, tablet, mobile navigation device, etc.), vehicle electronics (e.g., vehicle control modules, avionics, boat electronics, etc.), wearables (e.g., smart watches or smart glasses), gaming devices, audio/video capturing devices (e.g., cameras or video cameras), and/or IoT devices (e.g., smart consumer electronics, smart appliances, smart speakers, smart home devices, smart meters, etc.). The device 110 includes data processing hardware 116 and memory hardware 118 in communication with the data processing hardware 116 and storing instructions, that when executed by the data processing hardware 116, cause the data processing hardware 116 to perform one or more operations (e.g., related to GNSS localization). In some examples, the device 110 includes one or more applications (i.e., software applications) where each application may utilize the locational system 120 associated with device 110 to perform various functions within the application. For instance, the device 110 includes a navigation application configured to display the location 12 of the device 110 for the user 10.

Furthermore, the device 110 may be configured to communicate via a network 130 with a remote system 140. The remote system 140 may include remote resources, such as remote data processing hardware 142 (e.g., remote servers or CPUs) and/or remote memory hardware 144 (e.g., remote databases or other storage hardware). The device 110 may utilize the remote resources to perform various functionality related to GNSS localization. For instance, the device 110 is configured to perform GNSS localization using the locational system 120 and/or a bearing corrector 200. These systems 120, 200 may reside on the device 110 (referred to as on-device systems) or reside remotely (e.g., reside on the remote system 140), but in communication with the device 110. In some examples, some of the systems 120, 200 reside locally or on-device while others reside remotely. In other words, any of these systems 120, 200 or their functionality may be local or remote in any combination. For instance, when a system 120, 200 is rather large in size or processing requirements, the system 120, 200 may reside in the remote system 140. Yet when the device 110 may support the size or the processing requirements of one or more systems 120, 200, the one or more systems 120, 200 may reside on the device 110 using the data processing hardware 116 and/or the memory hardware 118. Optionally, the one or more of the systems 120, 200 may reside on both locally/on-device and remotely. For instance, one or more of the systems 120, 200 may default to execute on the remote system 140 when a connection to the network 130 between the device 110 and remote system 140 is available, but when the connection is lost or the network 130 is unavailable, the systems 120, 200 instead execute locally on the device 110.

The device 110 is in communication with the locational system 120 that is configured to perform GNSS localization for the receiver 114 and/or the device 110. The locational system 120 generally includes the bearing corrector 200. FIG. 1A depicts the locational system 120 in a dotted outline to indicate that one or more portions of the location system 120 and/or the bearing corrector 200 may not reside together (e.g., on the device 110 or the remote system 140). For instance, the bearing corrector 200 or its components may be an application (e.g., an application programming interface (API)) hosted on the remote system 140, but accessible to the device 110, while the locational system 120 resides on the device 110.

Referring further to FIG. 1A, each reflected signal $22_{REF\text{-}a,b}$ from the first and second satellites 20a-b includes an excess path length 24 (e.g., shown as a first excess path length 24, 24a and a second excess path length 24, 24b). As previously stated, the excess path length 24 is the difference between a length of the reflected signal $22_{REF}$ and a length of a line of sight signal $22_{LOS}$ from the same satellite 20. For instance, FIG. 1A depicts the length of the line of sight signal $22_{LOS}$ for the first satellite 20a as a combination of the dotted line that terminates at the user 10 and the solid line terminating at the first building 30, 30a. Based on this line of sight signal length, the excess path length 24a for the reflected signal $22_{REF}$ from the first satellite 20a is shown as the block portion along the reflected signal 22, $22_{REF\text{-}a}$. The excess path length 24, 24b for the second satellite 20b is shown in a similar manner.

In a system that performs conventional GNSS localization, the conventional system would identify the time-of-flight $TOF_{REF}$ for the signals 22 actually received at the receiver 114 (e.g., the reflected signals $22_{REF}$ that are not blocked by buildings 30) and interpret the location 12 of the device 110 at the conventional positions 12, $12a\text{-}b_{CON}$ shown in FIG. 1A. In other words, the conventional system assumes the signal 22 is a line of sight signal $22_{LOS}$ rather than a reflected signal $22_{REF}$ and simply calculates the conventional position $12_{CON}$ as a straight line extension of the excess path length 24. For multiple signals 22 received at a receiver 114, GNSS localization would combine the determined location 12 for each satellite 20 to form an aggregate position. Here, the conventional system would combine the first conventional position 12, $12a_{CON}$ and the second conventional position 12, $12b_{CON}$ to form an aggregate position. As can be seen from FIG. 1A, a GNSS localization process performed in a conventional manner would interpret the receiver 114 as being located on the wrong side of the street compared to the actual position 12, $12_A$ of the receiver 114.

In addition to situating the receiver 114 on the wrong side of the street. The conventional GNSS localization measures a Doppler effect from the signal 22. The Doppler frequency is a function of the relative velocity of the receiver 114 with respect to the satellite 20 and an angle between the bearing 14 (or direction) of the receiver 114 along the ground plane and the angle at which the receiver 114 received the signal 22. Based on the Doppler frequency, GNSS localization (e.g., performed by the receiver 114 or a locational system) derives a speed and a direction of that speed (i.e., bearing) for the receiver 114. For this derivation, conventional GNSS localization assumes that the signal 22 is a line of sight signal $22_{LOS}$ from the satellite 20 to the receiver 114 (e.g., that the angle is equal to the altitude of the satellite 20). By this assumption, the GNSS localization fails to account for the fact that the signal 22 may be a reflected signal $22_{REF}$ with an angle other than the altitude of the satellite 20. This results in a measured bearing 14, $14_M$ that may be based on signal angle inaccuracies and cause the measured bearing 14, $14_M$ (e.g., shown as a first bearing 14, $14a_M$ and a second bearing 14, $14b_M$ from the first satellite $20a$ and the second satellite $20b$ respectively) to not accurately reflect the actual bearing 14, $14_A$ of the receiver 114.

Referring to FIG. 1B, systems may use the measured bearing $14_M$, for different GNSS-related services. Some of these systems use the measured bearing $14_M$ to represent the path 16 of travel for the receiver 114. For example, a mapping application represents the real-time or near real-time location of the user 10 on the map and indicates the bearing 14 or path 16 of the user 10. Often these systems represent the path 16 of travel of the receiver 114 as a proxy for the path 16 of travel for the user 10 or device 110 since devices 110 (e.g., mobile devices) today are generally carried by the user 10. In some examples, when systems represent the path 16 of travel for the receiver 114, these systems obtain a series of instantaneous locations 12 and bearings 14 of the receiver 114 (e.g., from the receiver 114 itself or a GNSS localization system) and process them into a path 16 (e.g., by applying a smoothing function across the series). Unfortunately, when a system represents the path 16 of travel using the measured bearing $14_M$, the measured bearing $14_M$ may inherently include some inaccuracies and not match the actual bearing $14_A$ for the receiver 114. Due to this mismatch, the smoothed path 16, $16s$ may appear unlike the actual path 16, $16_A$ of travel for the receiver 114. For instance, the smoothed path $16s$ in FIG. 1B appears to be a winding path 16 that partially drifts into the street due to the measured bearings $14_M$ while the actual path $16_A$ strolls gingerly down the sidewalk and out of peril's way.

To overcome the inaccuracies of a conventional GNSS localization system, the locational system 120 includes the bearing corrector 200. The bearing corrector 200 is configured to receive an estimated location $12_{EST}$ and a measured bearing $14_M$ of the receiver 114 (or the user/device 10/110 since may be presumed to be synonymous), to identify features 212 in the environment 100 about the estimated location $12_{EST}$ of the receiver 114, and to adjust the measured bearing 14:1 when the orientation of a feature 212 within the environment 100 correlates with the measured bearing $14_M$. In some examples, the adjustment to the measured bearing $14_M$ reorients the measured bearing $14_M$ to match the orientation of the feature 212 in the environment 100. To perform these operations, the bearing corrector 200 may generally include an environmental modeler 210 and an adjuster 220 as shown in FIGS. 2A-2F.

Referring to FIGS. 2A-2F, in some examples, the environmental modeler 210 receives an estimated location $12_{EST}$ (also referred to as an estimated position) from the locational system 120. For instance, the estimated location $12_{EST}$ may correspond to a location 12 where a conventional GNSS localization system believes the receiver 114 to be located (e.g., the conventional location $12_{CON}$ based on a line of sight assumption for the signal 22). In other examples, the environmental modeler 210 generates the estimated location $12_{EST}$ itself (e.g., based on conventional GNSS localization). In some configurations, the locational system 120 or the bearing corrector 200 determines the estimated location $12_{EST}$ of the receiver 114 by performing a grid-based search using the satellite signal strength data received at the receiver 114. For instance, the grid-based search may model the satellite signal attenuation in the urban environment 100 and identify the estimated location $12_{EST}$ as a location in the grid where the modeled satellite signal attenuation most closely matches the satellite signal strength data. Regardless of the approach to acquire the estimated location $12_{EST}$, with the estimated location $12_{EST}$, the environmental modeler 210 identifies one or more environmental features 212 about the estimated location $12_{EST}$.

To identify the one or more environmental features 212 about the estimated location $12_{EST}$, the environmental modeler 210 may obtain and/or generate a feature map 214 about the estimated location $12_{EST}$. The feature map 214 may include information regarding terrain and/or structures about the estimated location $12_{EST}$. Some examples of terrain and/or structures are buildings 30, roads 40, walkways, pedestrian corridors, etc. In some implementations, the feature map 214 is a representations of geographical data (also referred to as geodata) for the urban environment 100 as a whole or may be more specific to an area about the estimated location $12_{EST}$. In some examples, the environmental modeler 210 is in communication with geodata collection system(s) and/or geodata repositories to generate the feature map 214. The geodata used for the feature map 214 may be obtained or derived via imaging systems such as aerial imagery or satellite imagery. In some configurations, the environmental modeler 210 is conscientious of the size of the feature map 214 and may construct or acquire minimal data to form the feature map 214. For instance, the feature map 214 is formed from a more detailed map having a large data format (e.g., a three dimensional rendering of geodata), but only includes a subset of the data from this large format map. In one such example, the feature map 214 may be the equivalent of a pixel map with polygonal shapes (e.g., outlines) for features 212 (e.g., buildings 30 and/or roads 40) such that an orientation $212O$ of the features 212 is distinguishable. For example, with a square shape for a building 30, the bearing corrector 200 is able to identify the orientation $212_O$ for the building 30 based on the outline of the shape. Although FIGS. 2A-2F depict two to three features 212, $212a$-$c$ corresponding to a single building 30, $30a$ and intersecting roads 40, the feature map 214 is able to map any number of features 212 and may even span an entire city. In FIGS. 2A-2F, the feature map 214 represents a projection of features 212 on a plane parallel to Earth's surface.

Figure 2A:
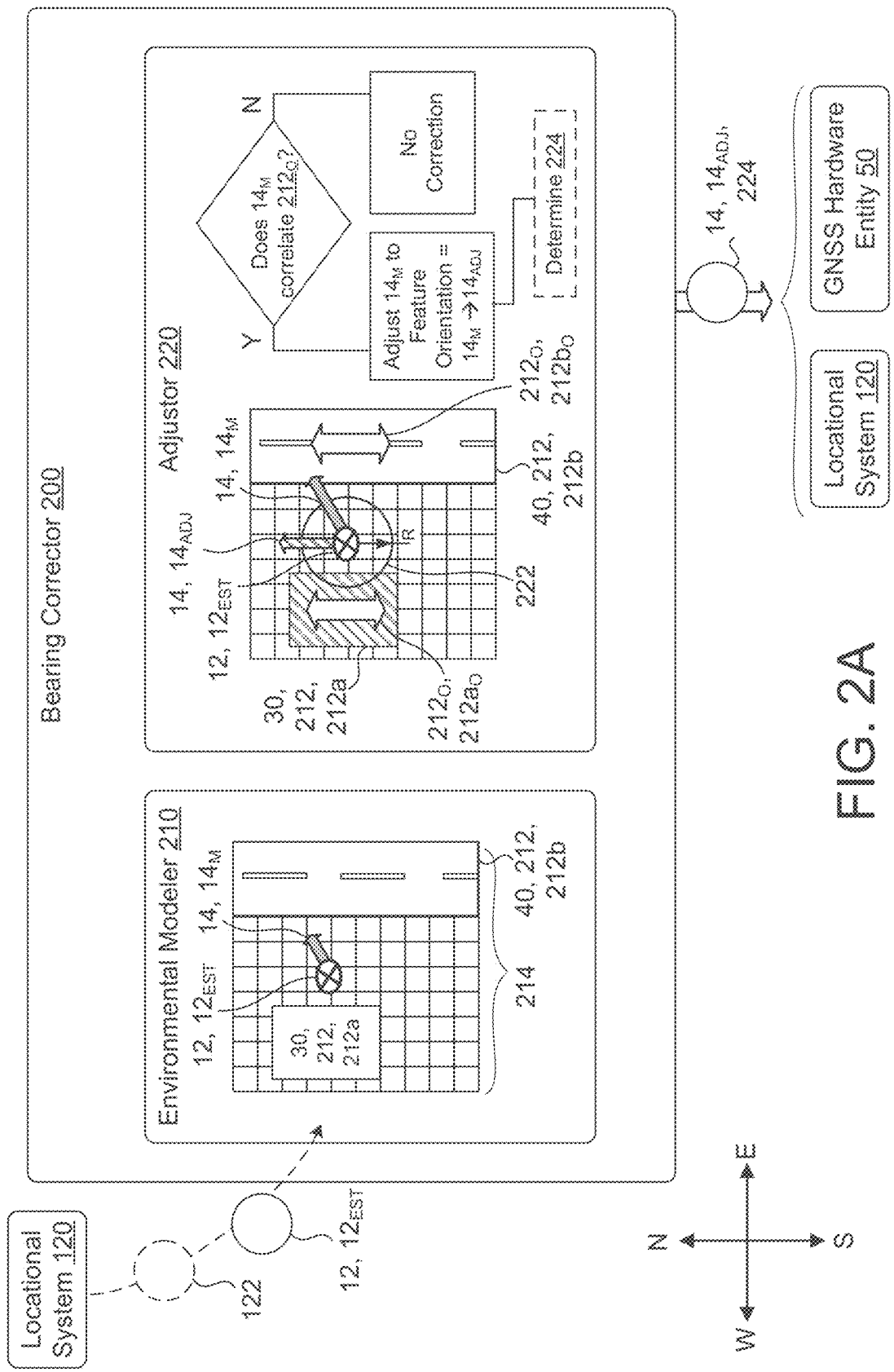
FIGS. 2A-2F are schematic views of example bearing correctors of FIG. 1A.
Figure 2B:
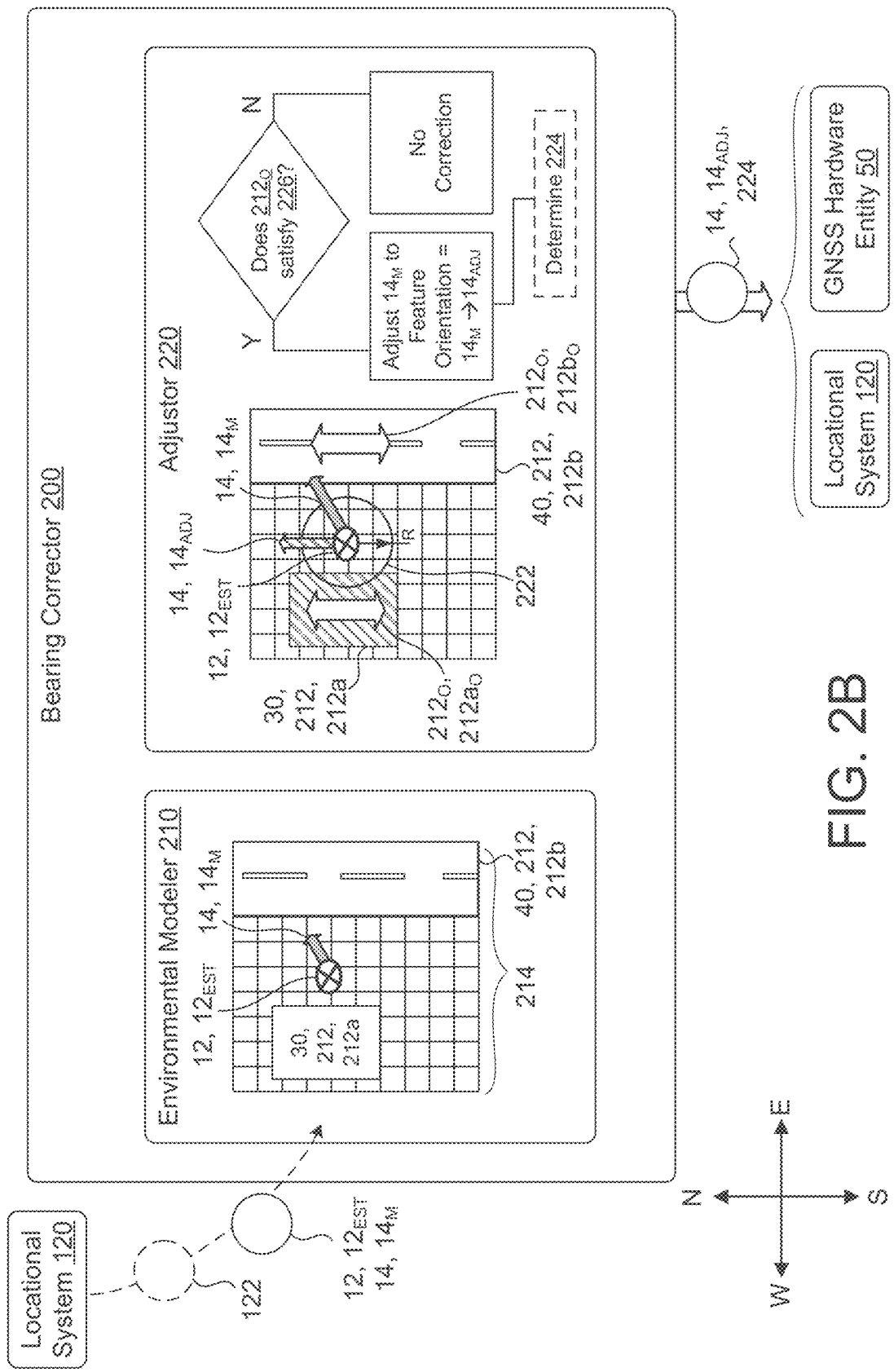

In some examples, the adjustor 220 is configured to receive features 212 and the measured bearing $14h$ for the estimated location $12_{EST}$ and to determine whether an orientation $212_O$ of one or more features 212 correlates to the measured bearing $14_M$. For example, the adjustor 220 receives features 212 identified by the environmental modeler 210 and the measured bearing $14_M$ from the locational system 120 (or the receiver 114). In some examples, the adjustor 220 receives the feature map 214 with the features 212 from the environmental modeler 210. When the orientation $212_O$ of a feature 212 correlates to the measured bearing $14_M$, the adjustor 220 is configured to adjust the measured bearing $14_M$ to generate an adjusted bearing 14, $14_{ADJ}$ (also referred to as an updated bearing). For instance, the adjustor 220 generates an adjusted bearing $14_{ADJ}$ that matches the orientation $212_O$ of the feature 212. For example, if the receiver 114 is moving along a second feature 212, 212b corresponding to a road 40, the adjustor 220 recognizes this relationship and generates an adjusted bearing $14_{ADJ}$ for the receiver 114 that matches the orientation 212c of the road feature 212b (e.g., as shown in FIG. 2A). In some implementations, the adjustor 220 communicates the adjusted bearing $14_{ADJ}$ as feedback to an entity responsible for the hardware of the receiver 114 (i.e., a GNSS chipset provider 50). This feedback may allow the responsible entity to improve the bearing computation capabilities of the receiver 114. In some configurations, the adjustor 220 communicates the adjusted bearing $14_{ADJ}$ to a system (e.g., via the locational system 120) or an entity that provides GNSS-based services that utilize the bearing 14 of the receiver 114 (e.g., a map provider integrated with GPS).

In some implementations, in order to determine whether a feature 212 has an orientation $212_O$ that correlates to the measured bearing $14_M$, the adjustor 220 determines a locational uncertainty 222 for the estimated location $12_{EST}$ of the receiver 114. In some examples, the system that reports the estimated location $12_{EST}$ also conveys the locational uncertainty 222 for the estimated location $12_{EST}$. In FIGS. 2A-2F, the adjustor 220 represents the locational uncertainty 222 as a circular area about the estimated location $12_{EST}$ where the size of the circle represents the range of positional uncertainty about the estimated location $12_{EST}$. Here, this locational uncertainty 222 has a radius R equal to the horizontal uncertainty of the estimated location $12_{EST}$ where the horizontal uncertainty corresponds to a reported standard deviation from the receiver 114. In some examples, the value for the radius R is equal to twice the horizontal uncertainty. The locational uncertainty 222 may also have an upper and lower bound referring to a maximum and a minimum value for the locational uncertainty 222. When the locational uncertainty exceeds these bounds, the adjustor 220 may be configured to not perform any adjustment of the measured bearing 144. In other words, the adjustor 220 recognizes when the locational uncertainty 222 is too great (e.g., exceeds the upper bound) or too small (e.g., exceeds the lower bound). The adjustor 220 may implement a minimum value for the uncertainty 222 as the lower bound to indicate that the estimated location $12_{EST}$ does not necessarily correspond to the precise actual location 124 of the receiver 114. For instance, the lower bound is set to twenty meters.

In some configurations, the adjustor 220 reports the locational uncertainty 222 as an adjusted bearing uncertainty 224 or factors the locational uncertainty 222 into the adjusted bearing uncertainty 224. The adjusted bearing uncertainty 224 refers to a confidence that the adjusted bearing $14_M$ of the receiver 114 matches the orientation $212_O$ of a feature 212 within the environment 100. The adjusted bearing uncertainty 224 also may provide an indication of the degree to which the actual bearing $12_A$ of the receiver 114 matches the orientation $212_O$ of a feature 212 within the environment 100. In some implementations, the adjusted bearing uncertainty 224 is the statistical variance determined from both (i) a certainty for the orientation $212_O$ of the feature 212 that is the basis for the adjusted bearing $14_{ADJ}$ and (ii) a certainty that the feature 212 used to adjust the bearing 14 is the best feature (i.e., a dominant feature) for the adjustment. In other words, a road 40 may be considered a more dominant feature than a building 30 because the road orientation is a more stable orientation. Stated differently, it is more likely that receiver 114 has a bearing 14 tracking a road 40 (e.g., the user 10 is walking along a sidewalk adjacent to the road 40 or driving along the road 40) than a particular building 30. For instance, the building 30 may have facade angles or an orientation that does not necessarily track a direction of travel for the user 10. The adjustor 220 and/or bearing corrector 200 may be configured to report the adjusted bearing uncertainty 224 with the adjusted bearing $14_{ADJ}$ (e.g., to the locational system 120 or to the GNSS hardware entity 50). In other words, the adjusted bearing uncertainty 224 may provide context to the adjusted bearing $14_{ADJ}$ and allow those who receive the adjusted bearing $14_{ADJ}$ to decide whether they should implement the adjusted bearing $14_{ADJ}$.

In some examples, the adjustor 220 decides that the measured bearing $14_M$ correlates to an orientation $212_O$ of a feature 212 when the relationship between (i) the estimated location $12_{EST}$ and a feature 212 and/or (ii) the measured bearing $14_M$ and a feature 212 satisfies a bearing adjustment threshold 226. Stated differently, when the relationship between (i) the estimated location $12_{EST}$ and a feature 212 and/or (ii) the measured bearing $14_M$ and a feature 212 fails to satisfy the bearing adjustment threshold 226, the adjustor 220 is configured to not adjust the measured bearing $14_M$. For instance, the adjustor 220 determines whether the estimated location $12_{EST}$ is within an acceptable proximity to a feature 212. To perform this determination, the adjustor 220 may determine whether the locational uncertainty 222 (e.g., the area of the circle with radius R) coincides with a feature 212. For example, the adjustor 220 identifies whether any portion of the polygonal area for a feature 212 intersects or overlaps with the locational uncertainty 222. To illustrate, FIGS. 2C and 2E contrast where the locational uncertainty 222 overlaps with the second feature 212b (e.g., shown in FIG. 2C as the vertical road 40) and where the locational uncertainty 222 does not overlap with any feature 212 (e.g., shown in FIG. 2E). Here, when there is no overlap, the adjustor 220 determines that the proximity between the estimated location $12_{EST}$ r and the feature 212 does not satisfy the bearing adjustment threshold 226 and does not generate an adjusted bearing $14_{ADJ}$. This check of acceptable proximity enables the adjustor 220 to evaluate whether the estimated location $12_{EST}$ is close enough to a feature 212 to be unambiguously associated with the orientation $212_O$ of the feature 212.

Besides evaluating proximity, the bearing adjustment threshold 226 may also be a means to evaluate the relationship between the measured bearing $14_M$ and the orientation $212_O$ of a feature 212. In other words, it would not be wise for the adjustor 220 to adjust the measured bearing $14_M$ when the direction represented by the measured bearing $14_M$ is clearly at odds with the orientation $212_O$ of the feature 212. Stated differently, if the receiver 114 appears to be moving in a direction perpendicular to a feature 212 (e.g., a road feature 212b) according to the measured bearing $14_M$, adjusting the measured bearing $14_M$ to the orientation $212_O$ of the feature 212 would be a significant adjustment; the greater this significance, the more likely that the change will actually incorrectly model the actual bearing $14_A$ of the receiver 114. For these reasons, the bearing adjustment threshold 226 may include a maximum angle (e.g., twenty-two degrees) that the adjustor 220 is able to change the measured bearing $14_M$. In other words, the change of the angle between the adjusted bearing $14_{ADJ}$ and the measured bearing $14_M$ cannot exceed the maximum angle set by the bearing adjustment threshold 226. For instance, referring to FIG. 2F, although the locational uncertainty 222 overlaps with a third feature 212c (e.g., a horizontal road 40), if the adjusted bearing $14_{ADJ}$ was set equal to the horizontal orientation $212_O$ of the third feature 212c the change between the measured bearing $14_M$ and the adjusted bearing $14_{ADJ}$ would be too great (e.g., approximately ninety degrees). Additionally or alternatively, the bearing adjustment threshold 226 may have (i) a proximity component to require a proximity between the estimated location $12_{EST}$ and a position of a feature 212 and an (ii) angle change component to constrain an amount the measured bearing $14_M$ may be adjusted.

Figure 2C:
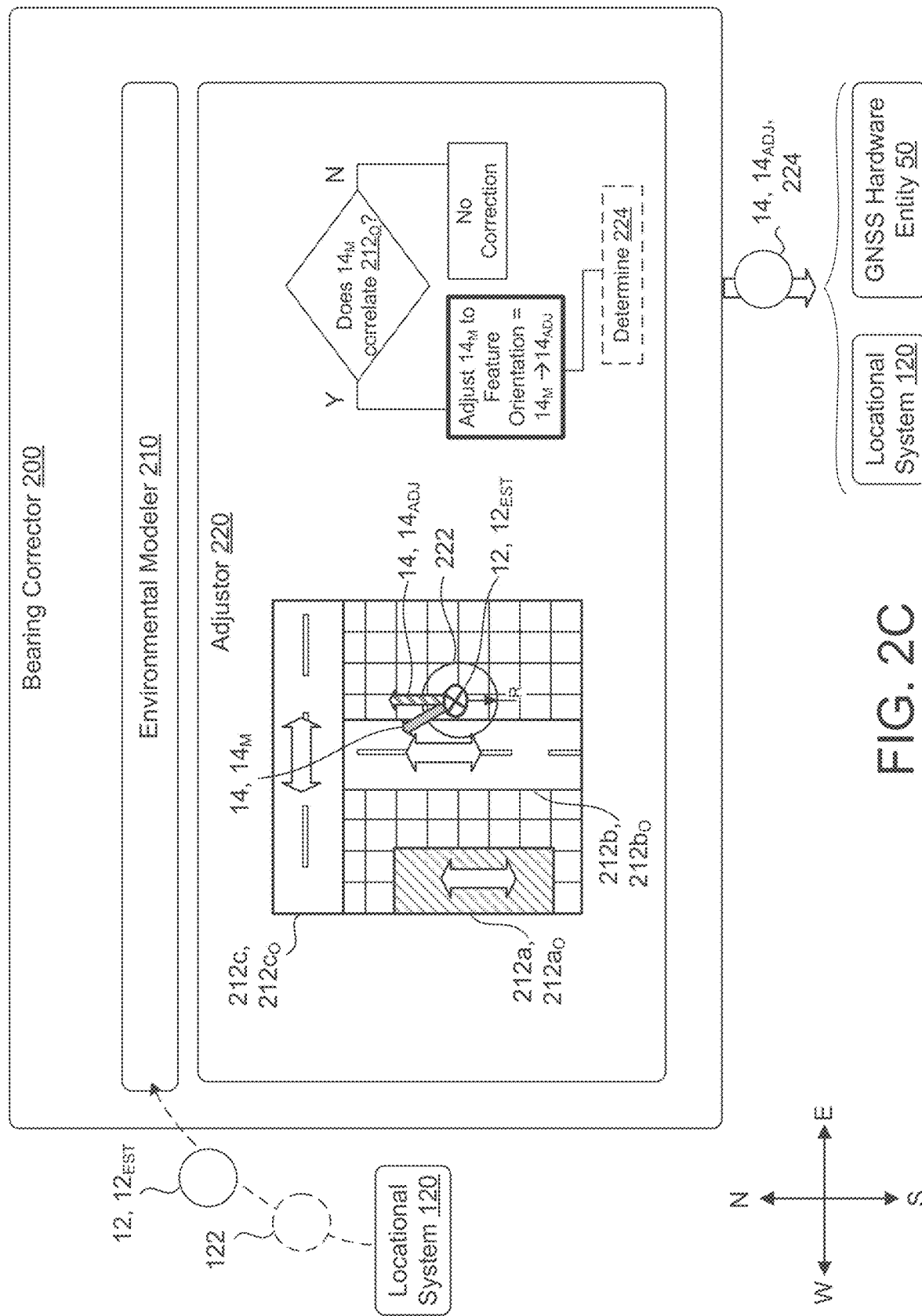
Figure 2D:
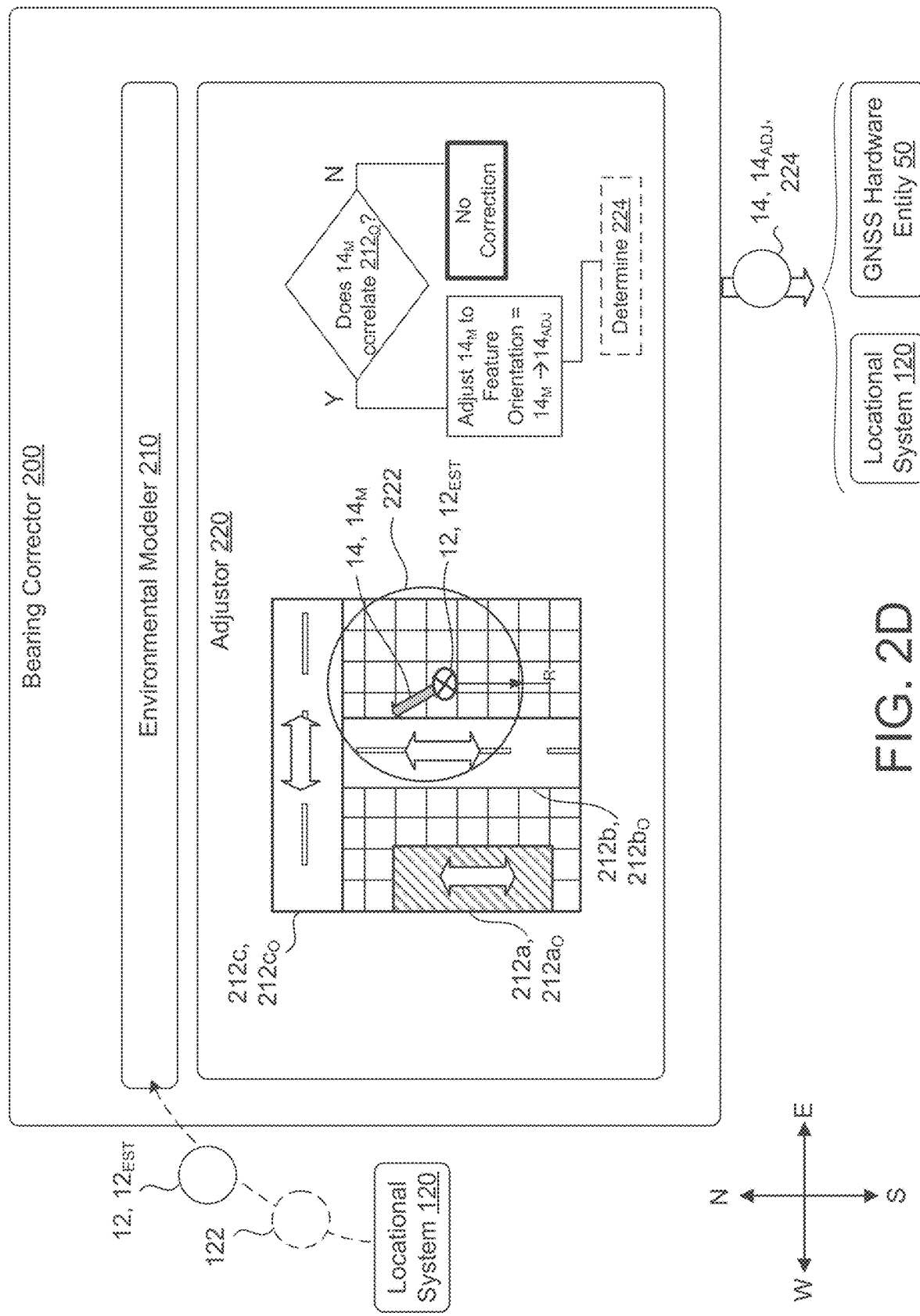
Figure 2E:
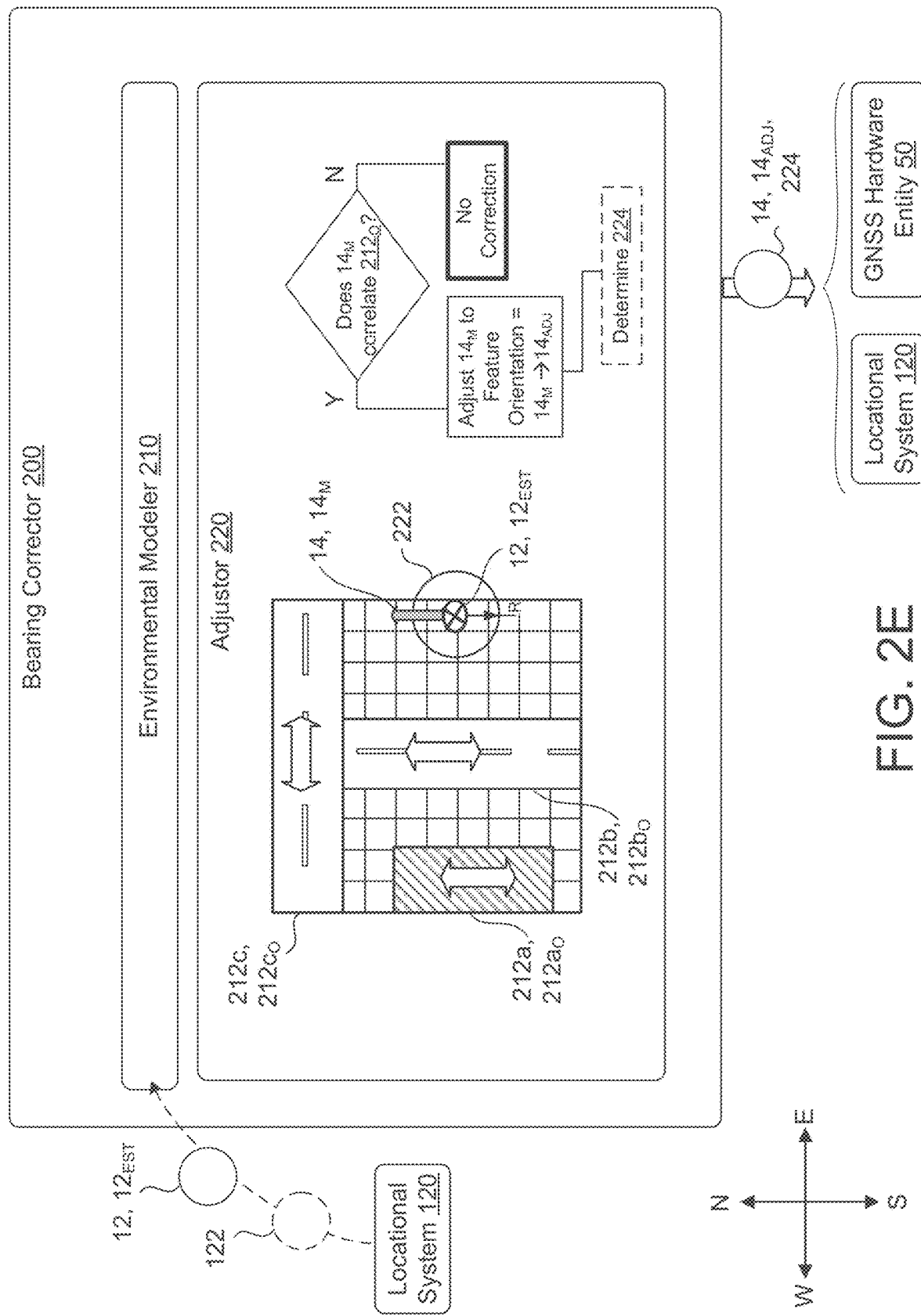
Figure 2F:
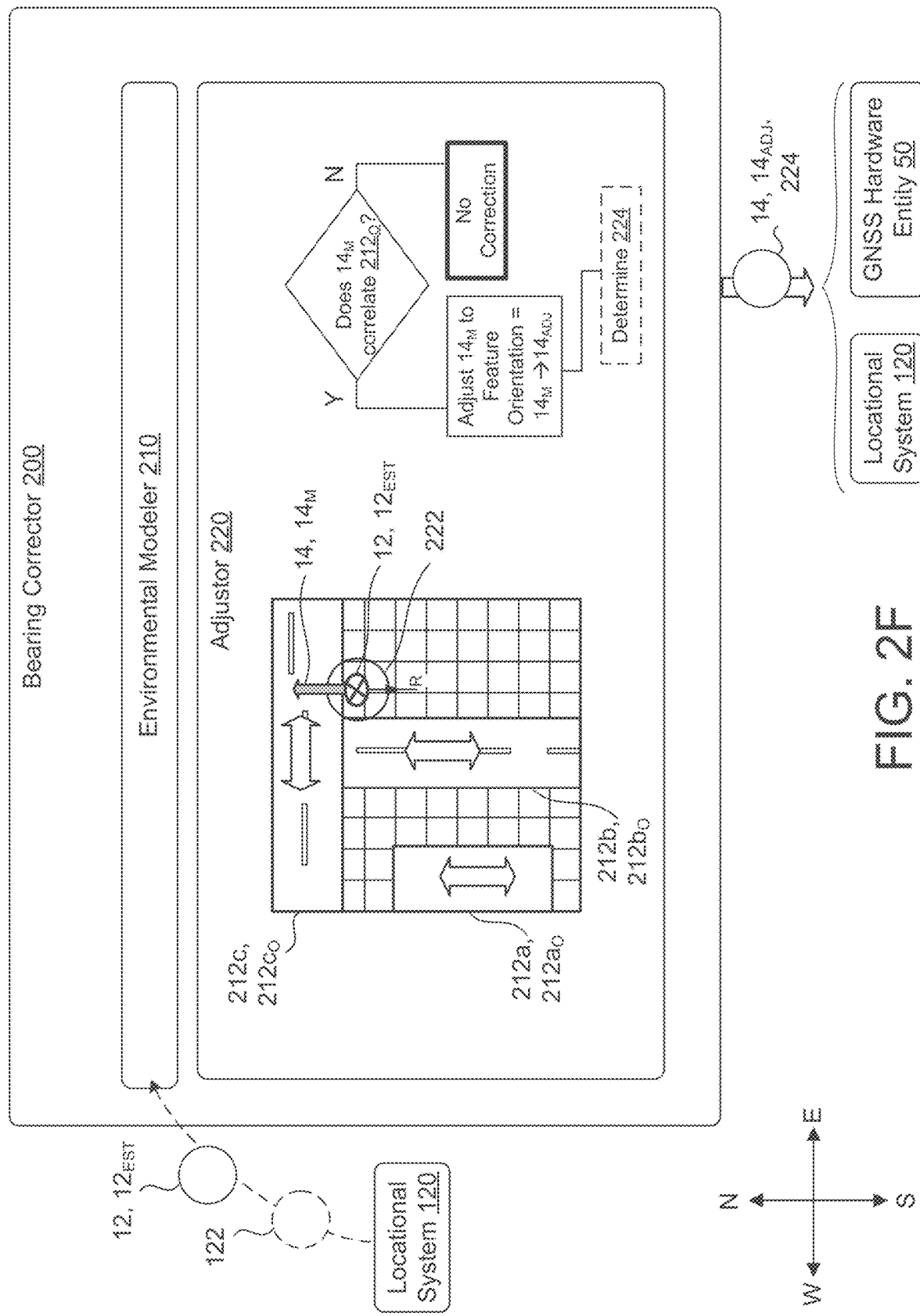

FIGS. 2C-2F illustrate different scenarios for the estimated location $12_{EST}$ and measured bearing 14N and the corresponding function of the adjustor 220 in these scenarios. In FIG. 2C, the locational uncertainty 222 overlaps with a second feature 212b shown as a vertical road 40. Here, the measured bearing $14_M$ is in a predominantly northerly direction similar to the North-South orientation of the second feature 212b. Based on these conditions, the adjustor 220 determines that the measured bearing $14_M$ correlates with the orientation $212_O$ of the second feature 212b and generates an adjusted bearing $14_{ADJ}$ pointing due North (i.e., an adjusted bearing $14_{ADJ}$ matching the orientation $212_O$ of the second feature 212b). In FIG. 2D, the adjustor 220 determines that there is no correlation between the features 212 in the urban environment 100 and the measured bearing $14_M$. For instance, in this example, the locational uncertainty 222 is too great and overlaps multiple features 212. Due to the large uncertainty 222 overlapping multiple features 212, the adjustor 220 determines that there is no clear correlation between the features 212 and the measured bearing $14_M$ because there does not appear to be a dominant feature that the adjustor 220 can confidently adjust the measured bearing $14_M$ to. In other words, the adjustor 220 avoids adjusting the measured bearing $14_M$ among this high uncertainty 222. In FIG. 2E, although the locational uncertainty 222 is fairly low, the adjustor 220 determines that there is no correlation between measured bearing $14_M$ and a feature 212 in the environment 100. This example also represents a situation where the estimated location $12_{EST}$ fails to satisfy the bearing adjustment threshold 226 because of a lack of proximity to any features 212. In contrast, FIG. 2F has a low locational uncertainty 222 much like FIG. 2E, but the adjustor 220 also determines that the measured bearing $14_M$ does not correlate with an orientation $212_O$ of a feature 212 and does not adjust the measured bearing $14_M$. This example illustrates a few reasons why the adjustor 220 may decide not to correct the measured bearing $14_M$. First, the dominant feature 212 appears ambiguous because arguably the receiver 114 may be walking along either road (e.g., the second feature 212b or the first feature 212c). Secondly, if the adjustor 220 did identify the third feature 212 as the dominant feature 212 and the adjustor 220 was configured with a bearing adjustment threshold 226 having a maximum allowable angle change, the ninety degree difference between the orientation $212_O$ of the third feature 212 and the measured bearing $14_M$ would cause the adjustor 220 to determine that a correlation of orientations is not actually present.

In some examples, other GNSS localization systems may piggy-back on the adjusted bearing $14_{ADJ}$. For instance, the locational system 120 employs a dynamic filter (e.g., a Kalman filter, Particle filter, etc.) that uses the adjusted bearing $14_{ADJ}$ over time to understand how the receiver 114 moves between epochs. Here, the dynamic filter may use the adjusted bearing $14_{ADJ}$ to weigh an apriori hypothesis or use it to predict a location 12 of the receiver 114 over time. In some implementations, the adjusted bearing $14_{ADJ}$ may provide an along-the-street accuracy to the locational system 120. In these implementations, the locational system 120 may recognize a pattern in the adjusted bearing $14_{ADJ}$ (e.g., it appears that the receiver 114 is walking along a particular road 40), and the locational system 120 may adjust its estimated location $12_{EST}$ based on the adjusted bearing $14_{ADJ}$.

Figure 3:
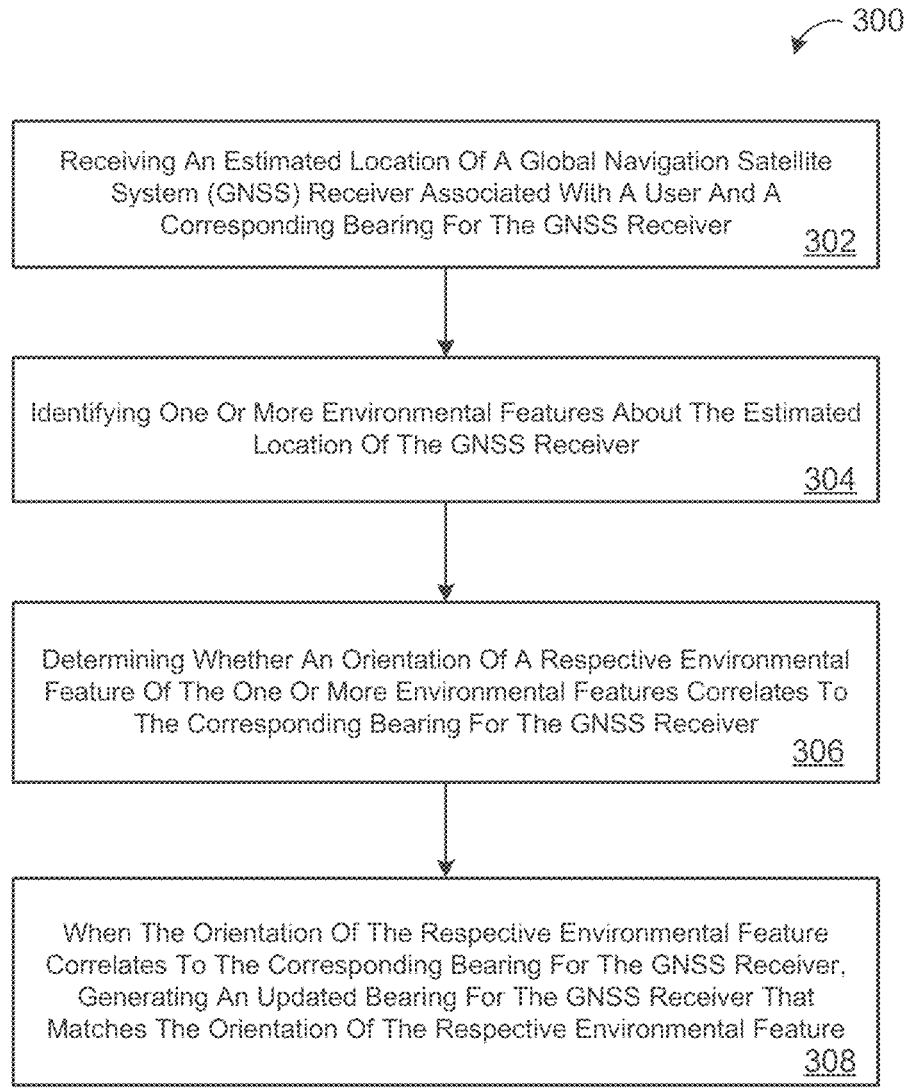
FIG. 3 is a flowchart of an example arrangement of operations for a method of adjusting bearing using environmental features.

FIG. 3 is a flowchart of an example arrangement of operations for a method 300 of localization using bearing from environmental features. At operation 302, the method 300 receives an estimated location $12_{EST}$ of a global navigation satellite system (GNSS) receiver 114 associated with a user 10 and a corresponding bearing $14_M$ for the GNSS receiver 114. At operation 304, the method 300 identifies one or more environmental features 212a-n about the estimated location $12_{EST}$ of the GNSS receiver 114. At operation 306, the method 300 determines whether an orientation $212_O$ of a respective environmental feature 212 of the one or more environmental features 212a-n correlates to the corresponding bearing $14_M$ for the GNSS receiver 114. When the orientation $212_O$ of the respective environmental feature 212 correlates to the corresponding bearing $14_M$ for the GNSS receiver 114, at operation 308, the method 300 generates an updated bearing $14_{ADJ}$ for the GNSS receiver 114 that matches the orientation $212_O$ of the respective environmental feature 212.

Figure 4:
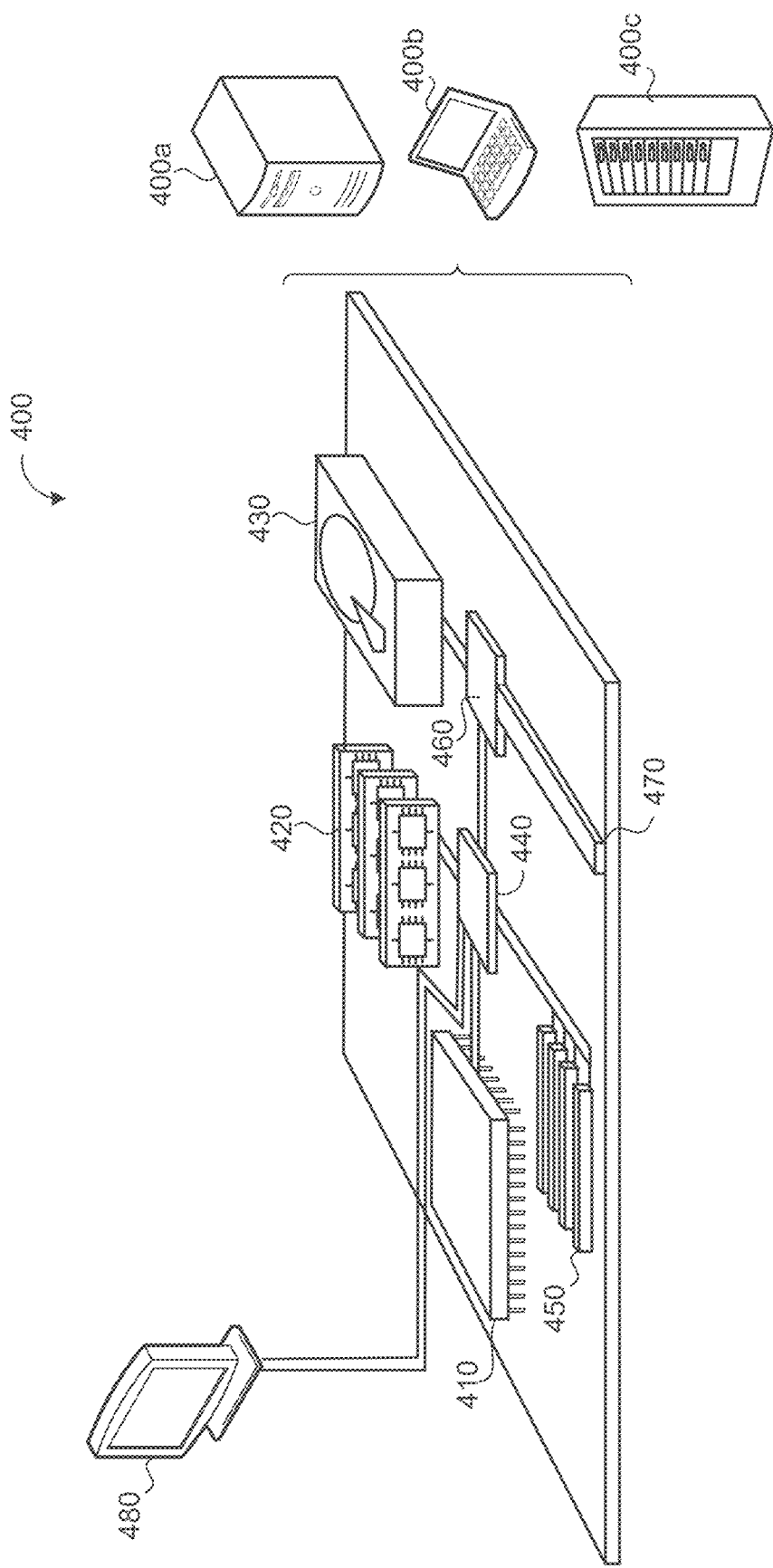
FIG. 4 is a schematic view of an example computing device that may be used to implement the systems and methods described herein.

FIG. 4 is schematic view of an example computing device 400 that may be used to implement the systems (e.g., the locational system 120 and the bearing corrector 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims

What is claimed is:
1. A method comprising:
receiving, at data processing hardware, an estimated location of a global navigation satellite system (GNSS) receiver associated with a user and a corresponding measured bearing for the GNSS receiver;
identifying, by the data processing hardware, one or more environmental features about the estimated location of the GNSS receiver;

determining, by the data processing hardware, an orientation of a respective environmental feature of the one or more environmental features;

determining, by the data processing hardware, that a difference in angles between the orientation of the respective environmental feature and the corresponding measured bearing for the GNSS receiver is less than a maximum acceptable change in angle;

in response to determining that the difference in angles between the orientation of the respective environmental feature and the corresponding measured bearing for the GNSS receiver is less than the maximum acceptable change in angle, determining, by the data processing hardware, that the orientation of the respective environmental feature correlates to the corresponding measured bearing for the GNSS receiver; and in response to determining that the orientation of the respective environmental feature correlates to the corresponding measured bearing for the GNSS receiver, generating, by the data processing hardware, an updated bearing for the GNSS receiver by reorienting the corresponding measured bearing to match the orientation of the respective environmental feature.

2. The method of claim 1, further comprising:
determining, by the data processing hardware, a respective location of the respective environmental feature,
wherein determining the orientation of the respective environmental feature correlates to the corresponding measured bearing for the GNSS receiver is further based on a proximity of the respective location of the respective environmental feature with respect to the estimated location of the GNSS receiver.

3. The method of claim 1, further comprising generating, by the data processing hardware, a search area centered about the estimated location of the GNSS receiver, the search area indicating locational uncertainty for the estimated location of the GNSS receiver.

4. The method of claim 3, further comprising:
determining, by the data processing hardware, whether the respective environmental feature is at least partially located in the search area centered about the estimated location of the GNSS receiver,
wherein determining the orientation of the respective environmental feature correlates to the corresponding measured bearing for the GNSS receiver is further based on determining the respective environmental feature is at least partially located in the search area centered about the estimated location of the GNSS receiver.

5. The method of claim 1, wherein receiving the estimated location of the GNSS receiver further comprises determining the estimated location of the GNSS receiver based on a grid-based search using satellite signal strength data.

6. The method of claim 5, wherein the grid-based search models satellite signal attenuation from an environment about the GNSS receiver.

7. The method of claim 1, wherein the one or more environmental features correspond to environmental features of an aerial imagery map of an environment about the estimated location of the user.

8. The method of claim 1, further comprising communicating, by the data processing hardware, the updated bearing to an entity responsible for hardware of the GNSS receiver.

9. The method of claim 1, wherein the GNSS receiver is located in an urban environment and the GNSS receiver receives reflecting satellite signals based on the urban environment.

10. A system comprising:
data processing hardware; and
memory hardware in communication with the data processing hardware, the memory hardware storing instructions that when executed on the data processing hardware cause the data processing hardware to perform operations comprising:
receiving an estimated location of a global navigation satellite system (GNSS) receiver associated with a user and a corresponding measured bearing for the GNSS receiver;
identifying one or more environmental features about the estimated location of the GNSS receiver;
determining an orientation of a respective environmental feature of the one or more environmental features;
determining that a difference in angles between the orientation of the respective environmental feature and the corresponding measured bearing for the GNSS receiver is less than a maximum acceptable change in angle;
in response to determining that the difference in angles between the orientation of a respective environmental feature and the corresponding measured bearing for the GNSS receiver is less than the maximum acceptable change in angle, determining that the orientation of the respective environmental feature correlates to the corresponding measured bearing for the GNSS receiver; and
in response to determining that the orientation of the respective environmental feature correlates to the corresponding measured bearing for the GNSS receiver, generating an updated bearing for the GNSS receiver by reorienting the corresponding measured bearing to match the orientation of the respective environmental feature.

11. The system of claim 10, wherein the operations further comprise:
determining a respective location of the respective environmental feature,
wherein determining the orientation of the respective environmental feature correlates to the corresponding measured bearing for the GNSS receiver is further based on a proximity of the respective location of the respective environmental feature with respect to the estimated location of the GNSS receiver.

12. The system of claim 10, wherein the operations further comprise generating a search area centered about the estimated location of the GNSS receiver, the search area indicating locational uncertainty for the estimated location of the GNSS receiver.

13. The system of claim 12, wherein the operations further comprise:
determining whether the respective environmental feature is at least partially located in the search area centered about the estimated location of the GNSS receiver,
wherein determining the orientation of the respective environmental feature correlates to the corresponding measured bearing for the GNSS receiver is further based on determining the respective environmental feature is at least partially located in the search area centered about the estimated location of the GNSS receiver.

14. The system of claim 10, wherein receiving the estimated location of the GNSS receiver further comprises determining the estimated location of the GNSS receiver based on a grid-based search using satellite signal strength data.

15. The system of claim 14, wherein the grid-based search models satellite signal attenuation from an environment about the GNSS receiver.

16. The system of claim 10, wherein the one or more environmental features correspond to environmental features of an aerial imagery map of an environment about the estimated location of the user.

17. The system of claim 10, wherein the operations further comprise communicating the updated bearing to an entity responsible for hardware of the GNSS receiver.

18. The system of claim 10, wherein the GNSS receiver is located in an urban environment and the GNSS receiver receives reflecting satellite signals based on the urban environment.

\* \* \* \* \*